(12) United States Patent
Miyazaki et al.

(10) Patent No.: US 8,464,823 B2
(45) Date of Patent: Jun. 18, 2013

(54) MOTORCYCLE

(75) Inventors: Takaaki Miyazaki, Shizuoka (JP); Kouta Nakao, Shizuoka (JP); Yasuhiro Kawasaki, Shizuoka (JP); Takeshi Iimura, Tokyo (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 31 days.

(21) Appl. No.: 13/318,175

(22) PCT Filed: May 26, 2010

(86) PCT No.: PCT/JP2010/058920
§ 371 (c)(1),
(2), (4) Date: Oct. 31, 2011

(87) PCT Pub. No.: WO2010/137621
PCT Pub. Date: Dec. 2, 2010

(65) Prior Publication Data
US 2012/0043150 A1 Feb. 23, 2012

(30) Foreign Application Priority Data
May 27, 2009 (JP) ................................. 2009-127161

(51) Int. Cl.
*B62J 17/00* (2006.01)
(52) U.S. Cl.
USPC ........................................................ 180/219

(58) Field of Classification Search
USPC ........................................................ 180/219
See application file for complete search history.

(56) References Cited

U.S. PATENT DOCUMENTS

| | | | |
|---|---|---|---|
| 2009/0079156 A1* | 3/2009 | Ichihara | 280/152.1 |
| 2009/0108629 A1 | 4/2009 | Takahashi et al. | |
| 2009/0108630 A1 | 4/2009 | Nakao et al. | |
| 2009/0178870 A1* | 7/2009 | Takahashi et al. | 180/229 |
| 2012/0318598 A1* | 12/2012 | Fujiyama et al. | 180/219 |

FOREIGN PATENT DOCUMENTS

| | | |
|---|---|---|
| JP | 2004-210227 A | 7/2004 |
| JP | 2009-107568 A | 5/2009 |
| JP | 2009-107569 A | 5/2009 |
| JP | 3150238 U | 5/2009 |

OTHER PUBLICATIONS

Official Communication issued in International Patent Application No. PCT/JP2010/058920, mailed on Aug. 31, 2010.

* cited by examiner

*Primary Examiner* — Kevin Hurley
(74) *Attorney, Agent, or Firm* — Keating & Bennett, LLP

(57) ABSTRACT

A motorcycle prevents an increase in air resistance and prevents wind and mud from hitting a rider during travelling of the motorcycle. A side cover of the motorcycle includes a first side cover and a second side cover. The first side cover is disposed laterally outwards of a head pipe and a front fork. The second side cover is disposed laterally outwards of a portion of the first side cover. A lateral end of the second side cover is positioned laterally outwards of the first side cover. A rear edge of the first side cover is at least partially positioned rearwards of a rear edge of the second side cover.

10 Claims, 11 Drawing Sheets

MOTORCYCLE

BACKGROUND OF THE INVENTION

1. Field of the Invention

The present invention relates to a motorcycle, particularly to a motorcycle including a side cover.

2. Description of the Related Art

It has been widely known that a front cover and a side cover are attached to well-known motorcycles for reducing air resistance of the motorcycles and/or preventing wind and mud from hitting riders during travelling of the motorcycles. The front cover is arranged to cover the front side of a head pipe, whereas the side cover is arranged to cover the lateral side of the head pipe.

Some side covers are designed to cover the lateral side of roughly the entire front portion of the vehicle (a so-called full cowl motorcycle). On the other hand, side covers described in Japanese Laid-open Patent Application Publication No. JP-A-2004-210227 are designed to cover only the upper portion of the front portion of a motorcycle (a so-called half cowl motorcycle).

When the side covers described in JP-A-2004-210227 are used for a motorcycle, only a small portion of the front portion of the motorcycle is covered with the side covers. Therefore, such side covers are advantageous in that heat is prevented from being easily trapped in the front portion of the motorcycle, compared to side covers designed to cover roughly the entire front portion of a motorcycle. In other words, an engine cooling performance is enhanced by the side covers described in JP-A-2004-210227.

SUMMARY OF THE INVENTION

However, the side covers described in JP-A-2004-210227 have the following drawbacks due to the structure that only a small portion of the front portion of the motorcycle is covered with the side covers. Simply put, it is not easy to achieve an effect of reducing air resistance of the motorcycle and an effect of preventing wind and mud from hitting a rider during travelling of the motorcycle.

In some cases, mud and water scattering and flying towards a rider are splashed by wind flowing through a space positioned laterally inwards of the side covers (hereinafter referred to as "an inner space") during travelling of the vehicle. Especially in the case of the aforementioned side covers described in JP-A-2004-210227, mud and water can easily enter the inner space of the side covers. The amount of mud and water scattering and flying towards a rider via the inner space correlates to the amount of wind flowing through the inner space during travelling of the vehicle. Further, the amount of wind flowing through the inner space during travelling of the vehicle correlates to the area of the opening of the inner space. In other words, resistance of wind flowing through the inner space is increased in proportion to a reduction in the opening area of the inner space. Therefore, the amount of wind flowing through the inner space during travelling of the vehicle is reduced and the amount of mud and water scattering and flying towards a rider via the inner space is consequently reduced. It is thus preferable to reduce the opening area of the inner space for reducing the amount of mud and water scattering and flying towards a rider via the inner space.

In view of the above, the opening area of the inner space of the side covers could be reduced, for instance, by disposing the respective side covers closer to the transverse center of the vehicle than normal. Accordingly, it is possible to prevent mud and water from scattering and flying towards a rider via the inner space of the side covers. In this case, however, the outer ends of the side covers are required to be disposed closer to the transverse center of the vehicle than normal. As a result, it is difficult to sufficiently prevent wind flowing laterally outwards of the side covers from hitting a rider during travelling of the vehicle. It is also difficult to prevent mud and water from scattering and flying towards a rider from the laterally outward sides of the side covers. Taken together, it is difficult to simultaneously achieve a reduction in the amount of wind that flows laterally outwards of the side covers and hits a rider during travelling of the vehicle and a reduction in the amount of mud and water scattering and flying towards a rider via the inner space of the side covers.

For example, as described in JP-A-2004-210227, a pair of hollow side covers could be disposed for reducing the opening area of the inner space of the side covers without changing the positions of the outer ends of the side covers. When the side covers described in JP-A-2004-210227 are herein used, however, a large step is produced rearwards of each side cover. In other words, the transverse size of each hollow side cover is increased when the opening area of the inner space of each side cover is reduced without changing the position of the outer end of each side cover. Therefore, a large step is transversely produced between a fuel tank disposed rearwards of each side cover and the rear portion of each side cover. In this case, wind is changed into turbulence at the large steps produced rearwards of the side covers during travelling of the vehicle. In other words, an effect of regulating wind flow during travelling of the vehicle is deteriorated. Therefore, air resistance tends to be increased during travelling of the vehicle.

Preferred embodiments of the present invention provide a motorcycle that greatly reduces the amount of wind that flows laterally outwards of the side cover and hits a rider during travelling of the vehicle and the amount of mud and water scattering and flowing towards a rider via the inner space of the side cover and that prevents air resistance from being increased during travelling of the vehicle.

A motorcycle according to a preferred embodiment of the present invention includes a vehicle body frame, a steering shaft, a front fork, a front wheel, a fuel tank, a seat, an engine, a front cover and a side cover. The vehicle body frame includes a head pipe. The steering shaft is rotatably inserted into the head pipe. The front fork is attached to the steering shaft. The front wheel is rotatably supported by a bottom portion of the front fork. The fuel tank is disposed rearwards of the head pipe. The seat is disposed rearwards of the fuel tank. The seat allows a rider to be seated thereon. The engine is disposed under the fuel tank while being disposed rearwards of the front wheel. The front cover is disposed forwards of the head pipe. The side cover is positioned higher than a rear end of the front wheel and a bottom end of the engine. The side cover is disposed laterally outwards of the head pipe and the front fork. Further, a rear end of the side cover is positioned rearwards of a front end of the fuel tank. The side cover includes a first side cover and a second side cover. The first side cover is disposed laterally outwards of the head pipe and the front fork. The second side cover is disposed laterally outwards of the partial first side cover positioned laterally outwards of the head pipe and the front fork. The second side cover includes a lateral end positioned laterally outwards of a lateral end of the first side cover. A rear edge of the first side cover is at least partially positioned rearwards of a rear edge of the second side cover.

According to the motorcycle of the preferred embodiment described above, it is possible to significantly reduce the amount of wind that flows laterally outwards of the side cover and hits a rider during travelling of the motorcycle and the amount of mud and water scattering and flying towards a rider through the inner space of the side cover, and simultaneously, to prevent an increase in air resistance during travelling of the motorcycle.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Exemplary Preferred Embodiment

Figure 1:
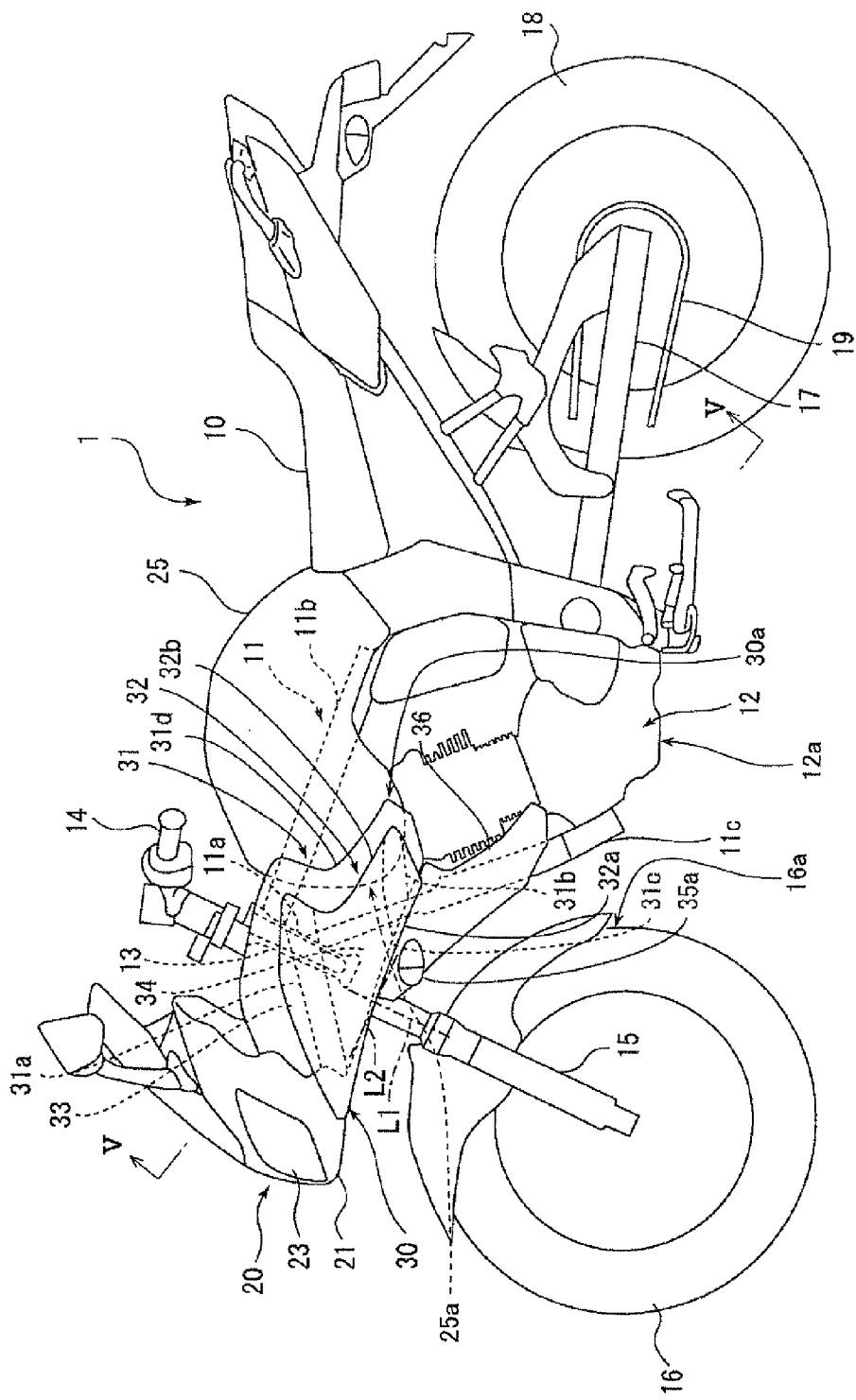
FIG. 1 is a schematic left side view of a motorcycle according to a first exemplary preferred embodiment of the present invention.

A motorcycle 1 illustrated in FIG. 1 will be hereinafter explained as a first exemplary preferred embodiment of the present invention. It should be noted that the motorcycle 1 illustrated in FIG. 1 is a so-called narrowly-defined on-road motorcycle. In the preferred embodiments of the present invention, however, the term "motorcycle" refers to both a widely-defined motorcycle and a narrowly-defined motorcycle. Simply put, it is intended in the preferred embodiments of the present invention that the term "motorcycle" includes an off-road motorcycle, a moped, a scooter and the like as well as the narrowly-defined motorcycle.

It should be noted that directional terms such as "front", "rear", "right", "left" and their related terms refer to directions seen from a rider seated on a seat 10 in the following explanation.

As illustrated in FIG. 1, the motorcycle 1 of the present exemplary preferred embodiment includes a vehicle body frame 11. The seat 10 and a fuel tank 25 are attached to the vehicle body frame 11. The fuel tank 25 is disposed rearwards of a head pipe 11a to be described below. The seat 10 is disposed rearwards of the fuel tank 25. A rider sits on the seat 10. Further, an engine 12 is attached to the vehicle body frame 11. The engine 12 is disposed under the fuel tank 25 and rearward of a front wheel 16. In the present exemplary preferred embodiment, the engine 12 is an air-cooled engine configured to be cooled by wind flowing thereto during travelling of the motorcycle. In preferred embodiments of the present invention, however, the engine is not limited to an air-cooled engine. For example, the engine may be a water-cooled engine configured to be cooled using cooling water or an oil-cooled engine configured to be cooled using cooling oil.

Figure 2:
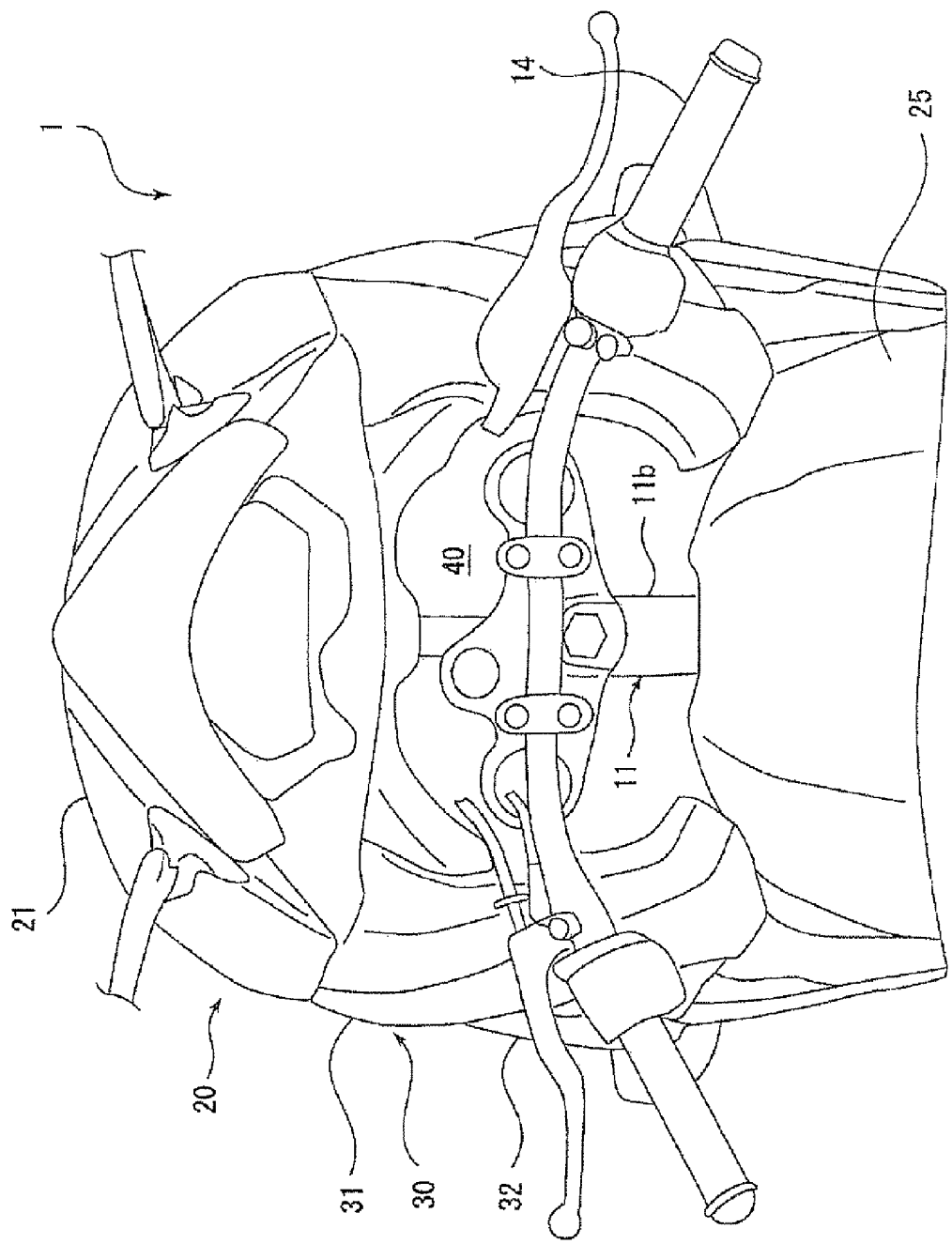
FIG. 2 is a schematic plan view of the front portion of the motorcycle.

The vehicle body frame 11 includes the head pipe 11a, a main frame 11b and a down frame 11c. The main frame 11b extends obliquely rearwards and downwards from the head pipe 11a and above the engine 12. As illustrated in FIG. 2, the main frame 11b is preferably provided as a single component in the present exemplary preferred embodiment. The main frame 11b extends rearwardly along a vehicle center axis arranged perpendicular or substantially perpendicular to a vehicle transverse (width) direction. In the preferred embodiments of the present invention, however, the structure of the main frame 11b is not limited to the above. For example, two or more frames may be provided for forming the main frame 11b.

The down frame 11c extends obliquely rearwards and downwards from the head pipe 11a, while being partially disposed under the engine 12.

A steering shaft 13 is rotatably inserted into the head pipe 11a. A handle unit 14 and a front fork 15 are attached to the steering shaft 13. The front wheel 16 is rotatably supported by the bottom portion of the front fork 15.

A pair of rear arms 17 is pivotably attached to the main frame 11b. A rear wheel 18 is rotatably supported by the rear portions of the rear arms 17. The rear wheel 18 is connected to an output shaft of the engine 12 through a power transmission mechanism 19 including a drive shaft, a chain and other suitable components.

Figure 3:
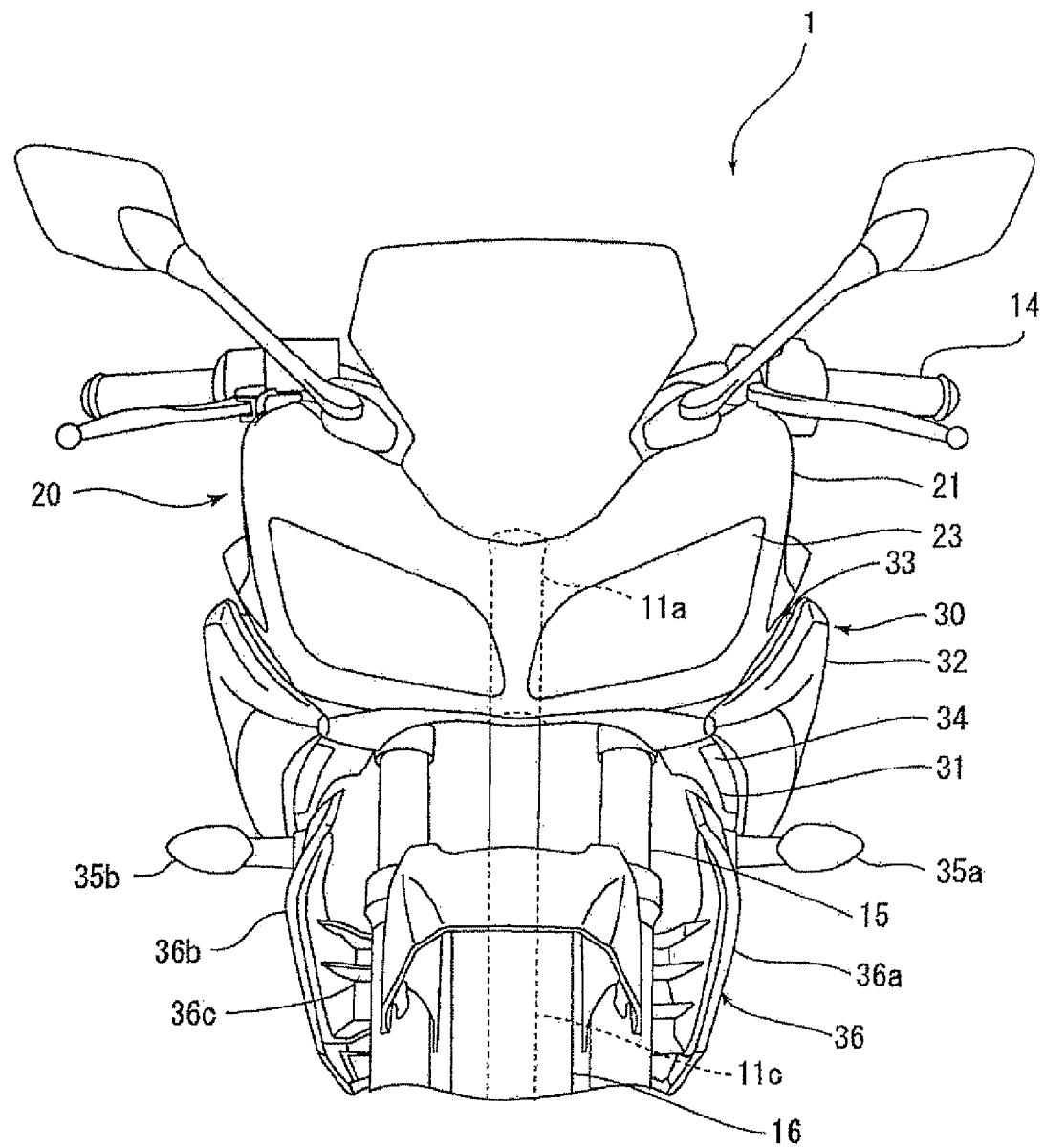
FIG. 3 is a schematic front view of the motorcycle.

Further, a cover 20 is attached to the vehicle body frame 11 as illustrated in FIGS. 1 to 3. The cover 20 includes a front cover 21 and a pair of side covers 30. The front cover 21 is disposed forwards of the head pipe 11a. The front cover 21 covers the head pipe 11a and the upper portion of the front fork 15 from the front side of the head pipe 11a and the upper portion of the front fork 15. A head light unit 23 is attached to the front cover 21.

Figure 4:
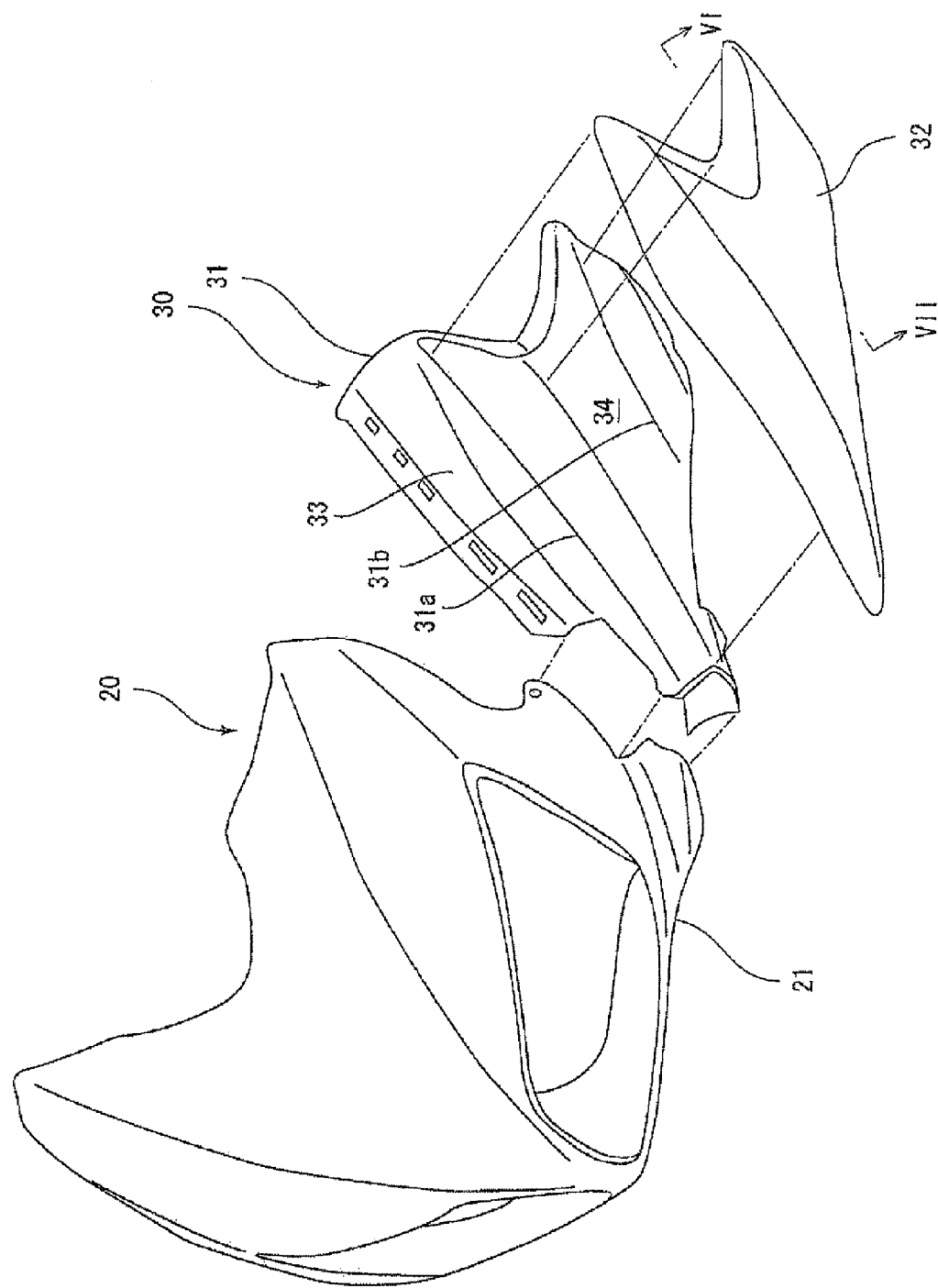
FIG. 4 is a schematic exploded perspective view of a front cover and a side cover.

As illustrated in FIG. 4, the front end of each side cover 30 is connected to the front cover 21. The side covers 30 cover the head pipe 11a and the upper portion of the front fork 15 from the outer lateral sides of the head pipe 11a and the upper portion of the front fork 15. It should be noted that the term "outer lateral sides" refers to directions that are spaced away from the vehicle center in the transverse direction. The cover 20 is a so-called half cowl.

As illustrated in FIG. 1, each side cover 30 is positioned higher than a rear end 16a of the front wheel 16 and a bottom end 12a of the engine 12. Each side cover 30 is disposed laterally outwards of the head pipe 11a and the front fork 15. Further, each side cover 30 is positioned higher than the front wheel 16 in an extended direction of a center axis L1 of the front fork 15 in a side view. In other words, each side cover 30 is disposed away from the front wheel 16 in the extended direction of the center axis L1 of the front fork 15 in a side view. Further, a portion of the bottom end surface of each side cover 30, positioned on the center axis of the front fork 15 in a side view, either extends parallel or substantially parallel to a straight line L2 perpendicular or substantially perpendicular to the center axis of the front fork 15 or extends in an upward direction toward the rear with respect to the straight line L2. More specifically, in the present exemplary preferred embodiment, a portion of the bottom end surface of each side cover 30, positioned on the center axis of the front fork 15 in a side view, extends in a slightly more upward direction toward the rear with respect to the straight line L2. Yet further, a rear end 30a of each side cover 30 is disposed rearwards of a front end 25a of the fuel tank 25.

Thus, the cooling performance of the engine 12 as an air-cooled engine can be enhanced using the side covers 30. It should be noted that the front cover 21 and the side covers 30 may be either an integrated component or separate components, for example.

It should also be noted that "the center axis of the front fork 15 in a side view" specifically refers to the center axis of the front fork 15 in a side view when the steering angle of the handle unit 14 corresponds to zero degrees.

Figure 5:
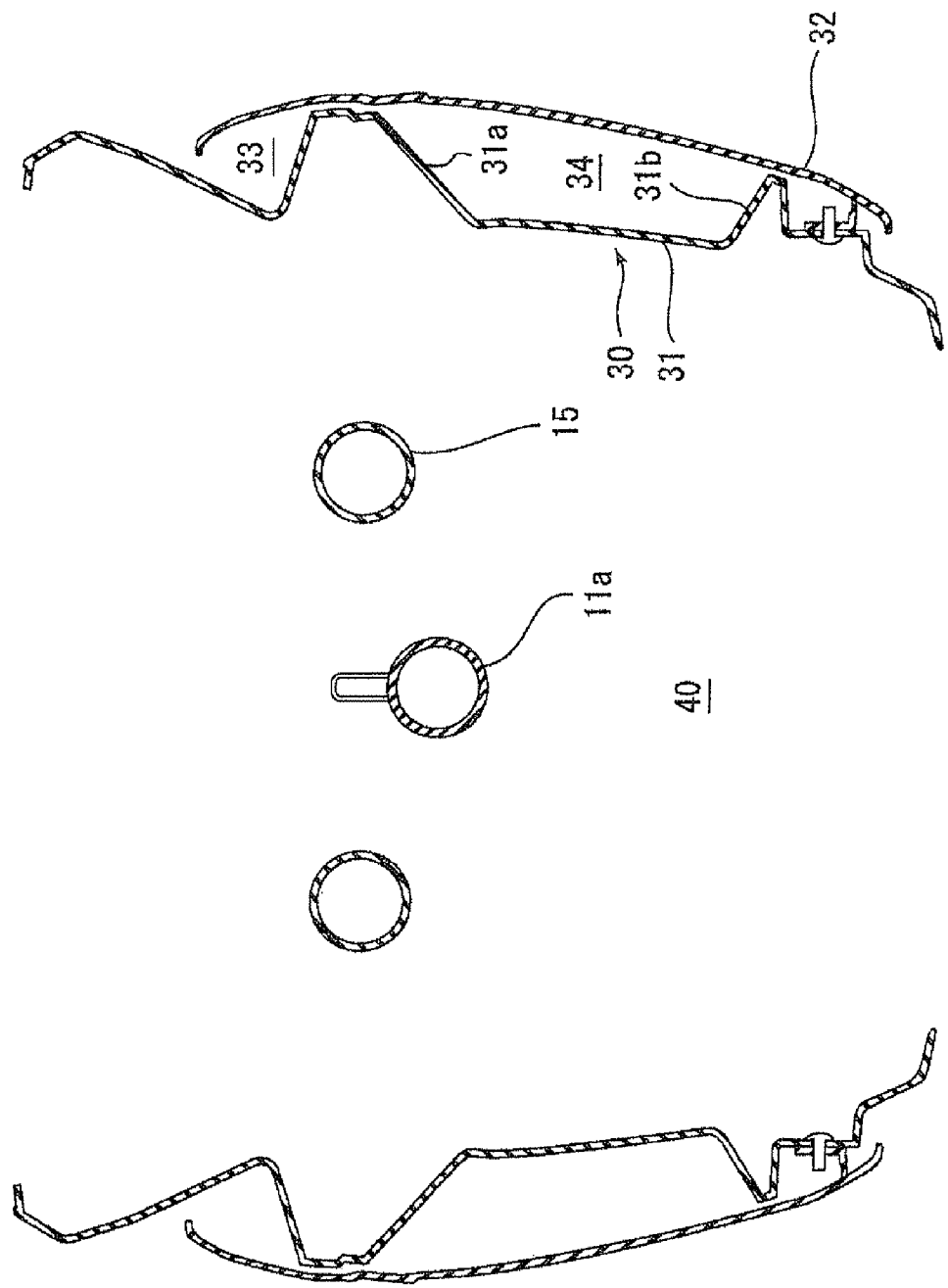
FIG. 5 is a schematic cross-sectional view of the motorcycle sectioned along a cutout line V-V in FIG. 1.

As illustrated in FIGS. 4 and 5, each side cover 30 includes a first side cover 31 and a second side cover 32 disposed laterally outwards of the first side cover 31. As illustrated in FIGS. 1, 2 and 5, the first side covers 31 are disposed laterally outwards of the head pipe 11a and the front fork 15. The first side covers 31 cover the head pipe 11a and the front fork 15 from the outer lateral sides of the head pipe 11a and the front fork 15. As illustrated in FIGS. 4 and 5, each first side cover 31 includes a first protrusion 31a and a second protrusion 31b. The first and second protrusions 31a and 31b extend laterally outwards. As illustrated in FIG. 1, the first and second protrusions 31a and 31b respectively extend in the longitudinal (back-and-forth) direction. The first and second protrusions 31a and 31b are disposed at a predetermined interval in the vertical (up-and-down) direction.

In the preferred embodiments of the present invention, a state of a component "extending in the longitudinal direction" is not limited to a state of the component extending parallel or substantially parallel to the longitudinal direction. Specifically, the state of a component "extending in the longitudinal direction" refers to a state in which an angle defined by the horizontal direction and the extending direction of the component is less than or equal to 45 degrees, for example. In other words, the state of a component "extending in the longitudinal direction" includes a state of the component extending at a slanted angle with respect to the horizontal direction.

Figure 6:
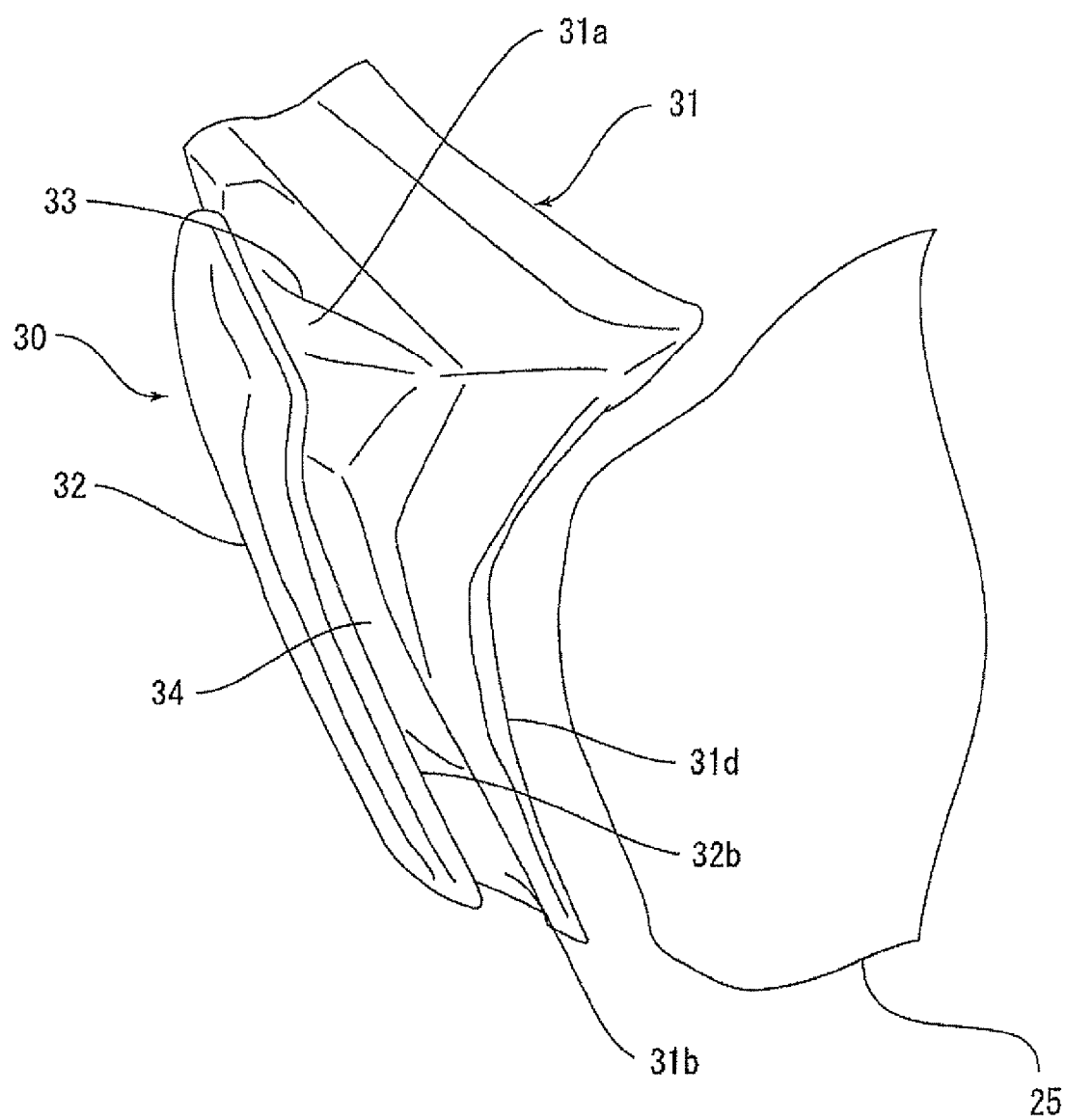
FIG. 6 is a left-rear perspective view of the side cover.

As illustrated in FIGS. 5 and 6, each second side cover 32 is fixed to the first and second protrusions 31a and 31b of the first side cover 31 paired therewith. As illustrated in FIGS. 1, 2 and 5, each second side cover 32 is disposed at a predetermined distance from the first side cover 31 paired therewith, while being disposed laterally outwards of a portion of the first side cover 31 paired therewith, i.e., a portion disposed laterally outwards of the head pipe 11a and the front fork 15. Therefore, a wind flow path is produced between each first side cover 31 and its paired second side cover 32 to allow wind to flow therethrough during travelling of the motorcycle. Specifically, a pair of grooves 33 is arranged as a first wind flow path in the present exemplary preferred embodiment. As illustrated in FIGS. 1, 3 and 5, each groove 33 is defined by the top surface of the first protrusion 31a of each first side cover 31, the outer surface of each first side cover 31, and the inner surface of the second side cover 32 paired with each first side cover 31. Each groove 33 is disposed above each first protrusion 31a. Further, a pair of holes 34 is provided as a second wind flow path, and each hole 34 is provided between each first protrusion 31a and each second protrusion 31b.

As illustrated in FIG. 3, the pair of the grooves 33 and the pair of the holes 34 are opened forwardly. As illustrated in FIG. 1, each groove 33 and each hole 34 extend in the longitudinal direction. Further as illustrated in FIG. 6, each groove 33 and each hole 34 are opened rearwardly. Wind is thereby introduced into each groove 33 and each hole 34 from the front ends thereof and is then directed rearwards through each groove 33 and each hole 34 during travelling of the motorcycle. Behind each second side cover 32, the rearwardly directed wind flow is joined with wind flowing laterally outwards of each second side cover 32.

As illustrated in FIGS. 1 and 4, the front end of each second side cover 32 is positioned forwards of the front end of the first side cover 31 paired with each second side cover 32. As illustrated in FIG. 1, a bottom end surface 32a of each second side cover 32 is positioned lower than a bottom end surface 31c of the first side cover 31 paired with each second side cover 32 in a side view. In the present exemplary preferred embodiment, the bottom end surface of each side cover 30 is thus defined by the bottom end surface 32a of each second side cover 32.

As illustrated in FIGS. 2, 3 and 6, the outer end of each second side cover 32 is positioned laterally outwards of the outer end of the first side cover 31 paired with each second side cover 32. It should be noted that the term "outer end" of a component refers to a laterally outermost portion of the component. Each second side cover 32 covers the most lateral-outwardly bulged portion of the first side cover 31 paired therewith. In other words, the most lateral-outwardly bulged portion of each side cover 30 is defined by each second side cover 32. On the other hand, the inner surface of each side cover 30 is defined by each first side cover 31.

As illustrated in FIG. 1, a rear edge 31d of each first side cover 31 is at least partially positioned rearwards of a rear edge 32b of the second side cover 32 paired with each first side cover 31. In other words, each first side cover 31 at least partially extends rearwards of its paired second side cover 32 at the same height position. Specifically, the rear edge 31d of each first side cover 31 is disposed entirely rearwards of the rear edge 32b of the second side cover 32 paired with each first side cover 31 in the present exemplary preferred embodiment. In other words, each first side cover 31 extends entirely rearwards of its paired second side cover 32 at the same height position.

The term "rear edge" of a component herein refers to a portion of the component where no portion exists therebehind at the same height position. In other words, an arbitrary portion of a component is not considered as "the rear edge" when the component further includes a portion positioned rearwards of the arbitrary portion at the same height position. By contrast, an arbitrary portion of a component is considered as "the rear edge" when the component includes no portion positioned rearwards of the arbitrary portion at the same height position.

As illustrated in FIGS. 1 and 3, a pair of flasher lamps (also referred to as "winker/blinker lamps") 35a and 35b is disposed under the side covers 30. Specifically, the flasher lamps 35a and 35b are attached to a wind guide member 36 disposed under the side covers 30. The wind guide member 36 directs wind towards the air-cooled engine 12 during travelling of the motorcycle. The wind guide member 36 includes a pair of sidewalls 36a and 36b and fins 36c. The sidewalls 36a and 36b are positioned laterally outwards of the down frame 11c. Further, the sidewalls 36a and 36b are disposed closer to the transverse center of the vehicle than the outer ends of the side cover 30. The flasher lamp 35a is attached to the sidewall 36a, whereas the flasher lamp 35b is attached to the sidewall 36b. The fins 36c are disposed along the transverse direction of the vehicle while being disposed between the sidewalls 36a and 36b.

Mud and water scattering and flying towards a rider includes those splashed by wind flowing through an inner space 40 of the side covers 30 during travelling of the motorcycle. The amount of mud and water scattering and flying via the inner space 40 correlates to the amount of wind flowing through the inner space 40 during travelling of the motorcycle. Further, the amount of wind flowing through the inner space 40 during travelling of the motorcycle correlates to the length and the opening area of the inner space 40. Resistance becomes larger in proportion to an increase in the length of the inner space 40 when wind flows through the inner space 40 during travelling of the motorcycle. Therefore, the amount of wind flowing through the inner space 40 during travelling of the motorcycle is reduced. Consequently, the amount of mud and water scattering and flying via the inner space 40 is reduced. Further, the resistance increases in proportion to a reduction in the opening area of the inner space 40 when wind flows through the inner space 40 during travelling of the motorcycle. Therefore, the amount of wind flowing through the inner space 40 during travelling of the motorcycle is reduced. Consequently, the amount of mud and water scattering and flying via the inner space 40 is reduced. Taken together, it is preferable to increase the length of the inner space 40 and reduce the opening area of the inner space 40 to reduce the amount of mud and water scattering and flying via the inner space 40.

In the present exemplary preferred embodiment, however, the length of each side cover 30 in the extended direction of the center axis L1 of the front fork 15 in a side view is shorter than that of a so-called full cowl motorcycle. The length of the inner space 40 (see FIGS. 2 and 5) of the side covers 30, i.e., the length of the space where the head pipe 11a and the front fork 15 are disposed, is short. In other words, wind easily flows through the inner space 40 during travelling of the vehicle. Therefore, mud and water, as well as wind, easily scatter and fly towards a rider via the inner space 40 during travelling of the motorcycle.

Especially, when only one main frame (i.e., the main frame 11b) extends rearwards from the head pipe iia as in the present exemplary preferred embodiment, the opening area of the inner space 40 is large. Therefore, mud and water easily scatter and fly towards a rider.

For example, it is possible to consider the structure that the side covers are disposed closer to the transverse center of the vehicle than they are normally disposed in order to reduce the opening area of the inner space of the side covers. In this case, it is possible to prevent mud and water from scattering and flying towards a rider via the inner space of the side covers. In this case, however, the outer ends of the side covers are required to be positioned closer to the transverse center of the vehicle than they are normally disposed. Therefore, it is difficult to sufficiently prevent wind flowing laterally outwards of the side covers from hitting a rider during travelling of the motorcycle. It is also difficult to reduce the amount of mud and water scattering and flying towards a rider from the laterally outward sides of the side covers. Overall, when each side cover is defined by a single plate member, for instance, it is difficult to prevent wind flowing laterally outwards of the side covers from hitting a rider during travelling of the motorcycle and simultaneously reduce the amount of mud and water scattering and flying towards a rider via the inner space of the side covers.

In the present exemplary preferred embodiment, by contrast, the motorcycle 1 is provided with two pairs of the first and second side covers 31 and 32 aligned in the transverse direction of the vehicle. Specifically, each first side cover 31 is positioned closer to the transverse center of the vehicle than it is normally disposed, whereas its paired second side cover 32 is positioned laterally outwards of each first side cover 31. It is thereby possible to reduce the opening area of the inner space 40 of the side covers 30 without changing the positions of the outer ends of the side covers 30. Consequently, it is possible to prevent mud and water from scattering and flying towards a rider via the inner space 40 and prevent mud and water from scattering and flying towards a rider via the laterally outward sides of the side covers 30. It is further possible to prevent wind flowing laterally outwards of the side covers 30 from hitting a rider during travelling of the motorcycle.

As described in JP-A-2004-210227, for instance, hollow side covers could be provided for reducing the opening area of the inner space of the side covers without changing the positions of the outer ends of the side covers. When the side covers described in JP-A-2004-210227 are used, however, a large step is produced rearwards of each side cover. In other words, the transverse size of each hollow side cover is required to be increased to reduce the opening area of the inner space of the side covers without changing the position of the outer end of each side cover. A transverse large step is accordingly formed between the fuel tank disposed rearwards of the side covers and the rear portion of each side cover. In this case, wind is changed into turbulence at the large steps formed rearwards of the side covers. In other words, an effect of regulating wind flow during travelling of the motorcycle is reduced. Therefore, air resistance tends to be increased during travelling of the motorcycle.

In the present exemplary preferred embodiment, by contrast, the rear edge 31d of each first side cover 31 is at least partially positioned rearwards of the rear edge 32b of its paired second side cover 32 disposed laterally outwards of each first side cover 31. In this structure, chances are low that a large step is produced between the fuel tank 25 and the rear portion of each side cover 30. Specifically, a small first step and a small second step are provided. The first step is disposed rearwards of the rear edge 32b of each second side cover 32 while being disposed laterally outwards of the first side cover 31 paired with each second side cover 32, whereas the second step is disposed rearwards of the rear edge 31d of the first side cover 31 paired with each second side cover 32. Therefore, turbulence is not easily produced rearwards of the side covers 30 during travelling of the motorcycle.

Especially in the present exemplary preferred embodiment, the rear edge 31d of each first side cover 31 is positioned entirely rearwards of the rear edge 32b of the second side cover 32 paired with each first side cover 31. Therefore, turbulence is not easily produced rearwards of the side covers 30 during travelling of the motorcycle.

Further in the present exemplary preferred embodiment, the groove 33 and the hole 34 define wind flow paths between each first side cover 31 and its paired second side cover 32. It is possible to direct wind to the rear of the rear edge 32b of each second side cover 32 via the groove 33 and the hole 34. The rearwardly directed wind can effectively prevent wind flowing laterally outwards of each side cover 30 from changing into turbulence in the position rearwards of each second side cover 32 during travelling of the motorcycle. In the present exemplary preferred embodiment, it is thereby possible to reduce air resistance during travelling of the motorcycle 1. Further, the rear edge 32b of each second side cover 32 gradually bends forwards from the top end thereof to the center portion thereof in the vertical direction. Yet further, the rear edge 32b of each second side cover 32 gradually bends forwards from the bottom end thereof to the center portion thereof in the vertical direction. Therefore, wind is easily discharged out of each hole 34 during travelling of the motorcycle.

As described above, the motorcycle of the present exemplary preferred embodiment can prevent an increase in air resistance, and simultaneously, effectively prevent wind, mud and water from hitting a rider during travelling of the motorcycle.

Figure 7:
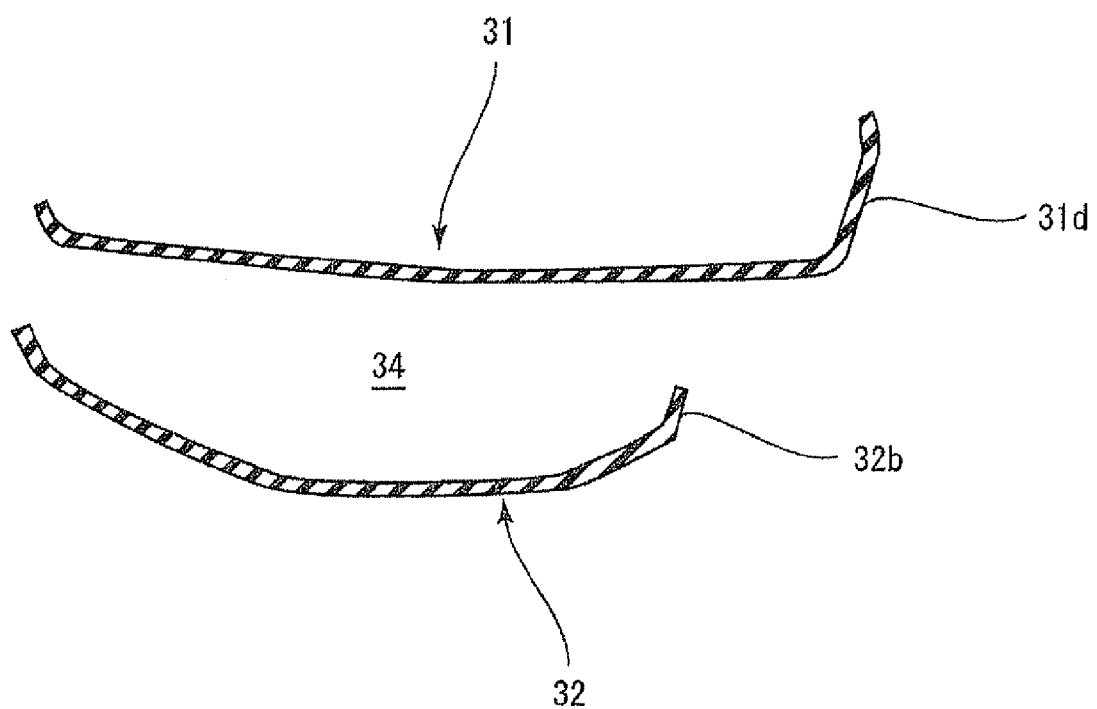
FIG. 7 is a schematic cross-sectional view of the side cover sectioned along a cutout line VII-VII in FIG. 4.

Further in the present exemplary preferred embodiment, the rear edge 31d of each first side cover 31 and the rear edge 32b of the second side cover 32 paired with each first side cover 31 extend towards the transverse center of the vehicle, as illustrated in FIGS. 6 and 7. Therefore, it is possible to more effectively prevent wind from irregularly flowing in the positions rearwards of the rear edge 31d of each first side cover 31 and the rear edge 32b of the second side cover 32 paired with each first side cover 31. Simply put, occurrence of turbulence is effectively prevented. Therefore, it is possible to effectively prevent an increase in air resistance against the motorcycle 1.

Further in the present exemplary preferred embodiment, the flasher lamps 35a and 35b are disposed under the lateral outwardly bulged side covers 30. The flasher lamps 35a and 35b can be thereby disposed closer to the transverse center of the vehicle, for instance, than flasher lamps disposed laterally outwards of the side covers are. Accordingly, it is possible to prevent an increase in air resistance produced due to attachment of the flasher lamps 35a and 35b.

In the present exemplary preferred embodiment, the structure has been exemplified in which the flasher lamps 35a and 35b are preferably attached to the wind guide member 36. In the present invention, however, the attachment of the flasher lamps 35a and 35b is not limited to the above. For example, the flasher lamps 35a and 35b may be attached to the vehicle body frame 11.

Further in the present exemplary preferred embodiment, the structure has been exemplified in which the protrusions 31a and 31b preferably are integrally formed with each first side cover 31. In the present invention, however, the structure of the protrusions 31 and 31b is not limited to the above. For example, the protrusions 31a and 31b may be integrally formed with each second side cover 32. Alternatively, the protrusions 31a and 31b may be provided as individual components separate from the first and second side covers 31 and 32.

Further in the present exemplary preferred embodiment, two protrusions are preferably provided for each side cover. However, a single protrusion or three or more protrusions may be provided for each side cover.

Another preferred exemplary preferred embodiment of the present invention will be hereinafter explained. It should be noted in the following explanation of the another exemplary preferred embodiment that the same reference numerals will be assigned to the components having substantially the same functions as those of the components of the aforementioned first exemplary preferred embodiment, and explanation thereof will be hereinafter omitted.

Second Exemplary Preferred Embodiment

Figure 8:
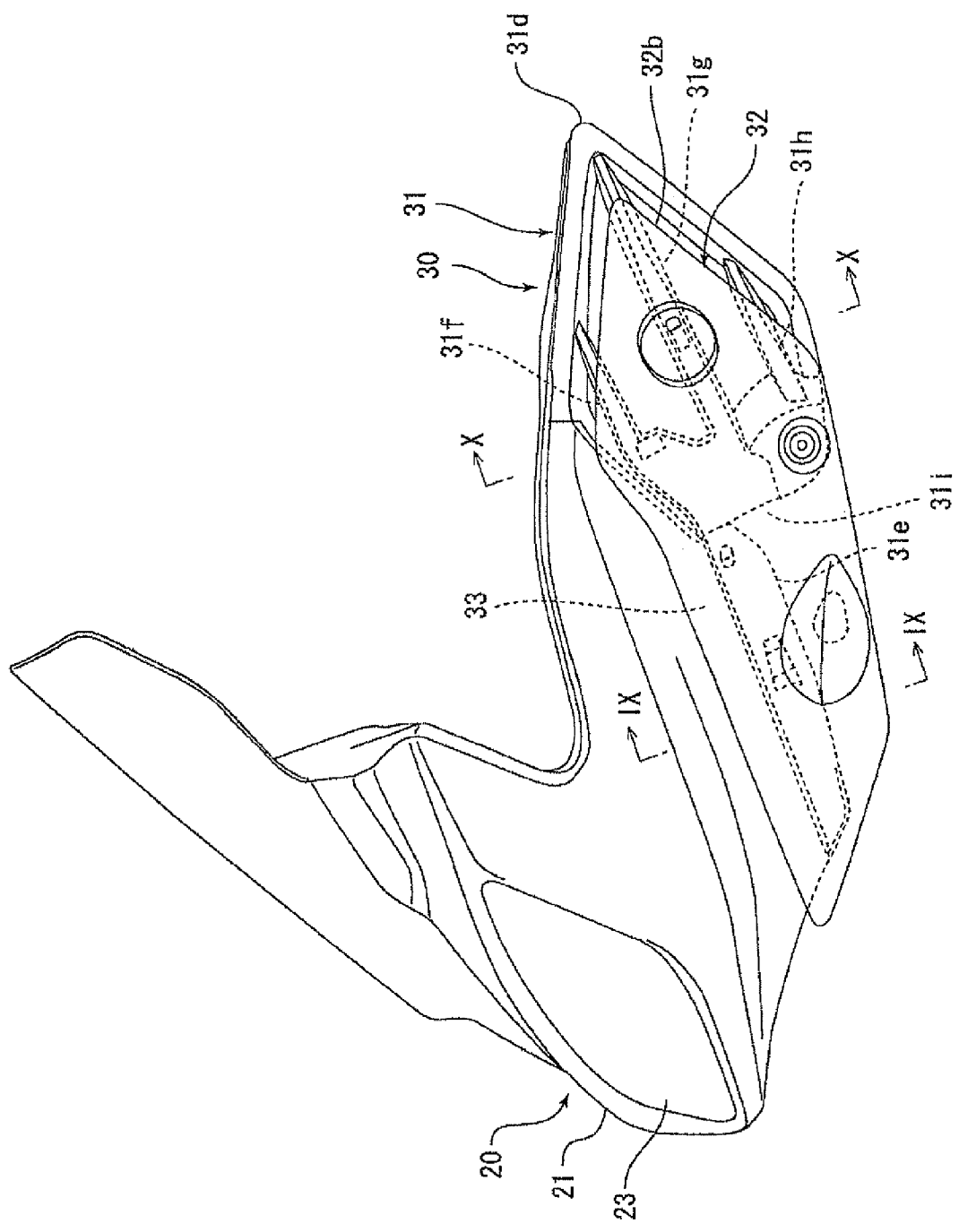
FIG. 8 is a schematic side view of a front cover and a side cover according to a second exemplary preferred embodiment of the present invention.
Figure 9:
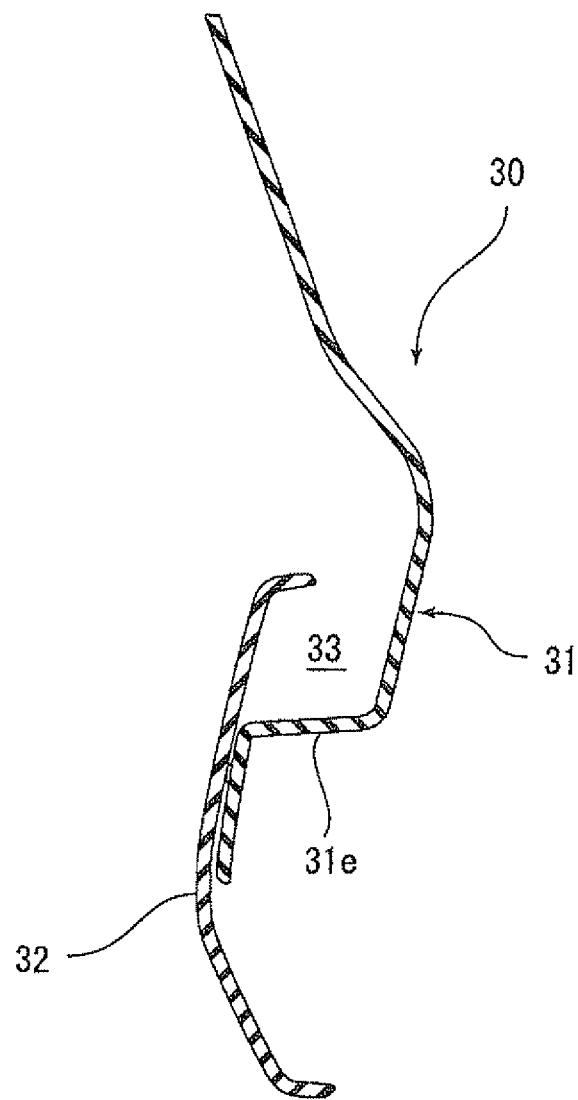
FIG. 9 is a schematic cross-sectional view of the side cover sectioned along a cutout line IX-IX in FIG. 8.
Figure 10:
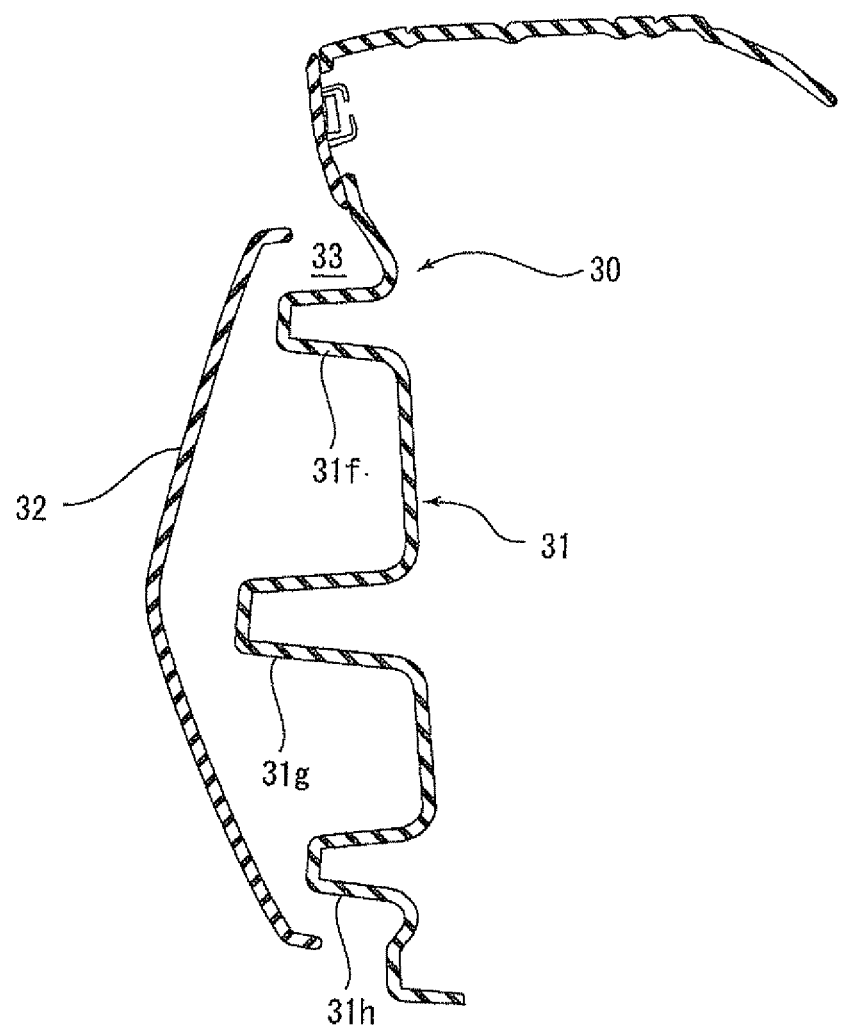
FIG. 10 is a schematic cross-sectional view of the side cover sectioned along a cutout line X-X in FIG. 8.
Figure 11:
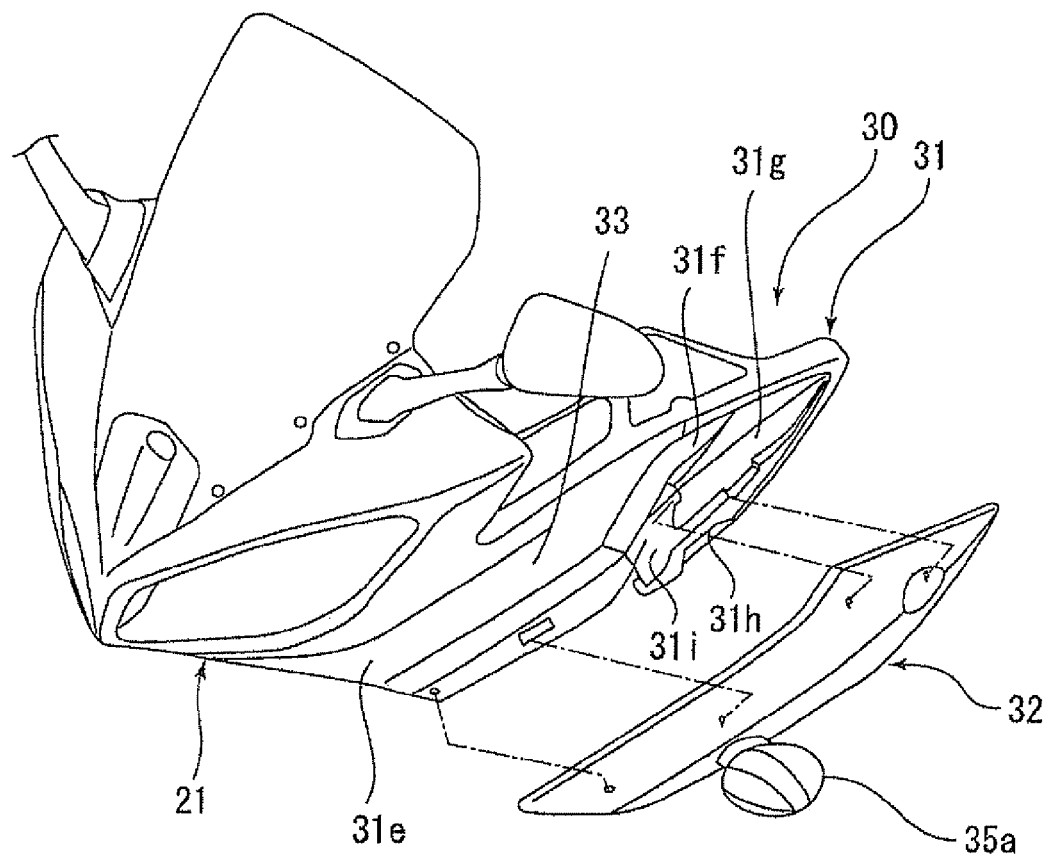
FIG. 11 is a schematic exploded perspective view of the front cover and the side cover according to the second exemplary preferred embodiment of the present invention.

FIG. 8 is a schematic side view of the front cover 21 and one of a pair of the side covers 30 according to a second exemplary preferred embodiment. FIG. 9 is a schematic cross-sectional view of each side cover 30 sectioned along a cutout line IX-IX in FIG. 8. FIG. 10 is a schematic cross-sectional view of each side cover 30 sectioned along a cutout line X-X in FIG. 8. FIG. 11 is a schematic exploded perspective view of the front cover 21 and one of the pair of the side covers 30.

In the present exemplary preferred embodiment, each first side cover 31 includes first to fifth protrusions 31e to 31i as illustrated in FIGS. 8 and 11. The first protrusion 31e is arranged in the front portion of each first side cover 31. The second to fourth protrusions 31f to 31h are positioned rearwards of the first protrusion 31e. The first to fourth protrusions 31e to 31h are disposed in a slightly upward direction toward the rear with respect to the horizontal direction while being disposed roughly in parallel to each other. The front ends of the second to fourth protrusions 31f to 31h are connected by the fifth protrusion 31i. Further, the rear end of the first protrusion 31e is also connected to the fifth protrusion 31i. In the present exemplary preferred embodiment, each side cover 30 thus includes only the groove 33 without including a hole functioning as a wind flow path, unlike the aforementioned first exemplary preferred embodiment.

It should be noted that the front and rear portions of each first side cover 31 are preferably separately provided as individual components in the present exemplary preferred embodiment. Further, the front portion of each first side cover 31 is preferably integrally formed with the front cover 21.

Further in the present exemplary preferred embodiment, the flasher lamps 35a and 35b are attached to the second side covers 32. The flasher lamps 35a and 35b are positioned laterally outwards of the second side covers 32.

Similarly to the aforementioned first exemplary preferred embodiment, the present exemplary preferred embodiment can prevent an increase in air resistance, and simultaneously, effectively prevent wind, mud and water from hitting a rider during travelling of the motorcycle.

According to the motorcycle of the preferred embodiments of the present invention, it is possible to significantly reduce the amount of wind that flows laterally outwards of the side covers and hits a rider during travelling of the motorcycle and the amount of mud and water scattering and flying towards a rider via the inner space of the side covers, and to simultaneously prevent an increase in air resistance during travelling of the motorcycle.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motorcycle comprising:
a vehicle body frame including a head pipe;
a steering shaft rotatably inserted into the head pipe;
a front fork attached to the steering shaft;
a front wheel rotatably supported by a bottom portion of the front fork;
a fuel tank disposed rearwards of the head pipe;
a seat disposed rearwards of the fuel tank, the seat allowing a rider to be seated thereon;
an engine disposed under the fuel tank, the engine disposed rearwards of the front wheel;
a front cover disposed forwards of the head pipe; and
a side cover positioned higher than a rearmost end of the front wheel and a bottom end of the engine, the side cover disposed laterally outwards of the head pipe and the front fork; wherein
a rear end of the side cover is positioned rearwards of a front end of the fuel tank;
the side cover includes:
a first side cover disposed laterally outwards of the head pipe and the front fork; and
a second side cover disposed laterally outwards of the first side cover;
the second side cover includes a lateral end positioned laterally outwards of a lateral end of the first side cover;

a rear edge of the first side cover is at least partially positioned rearwards of a rear edge of the second side cover; and a bottommost edge of the first side cover and a bottommost edge of the second side cover are each positioned higher than the rearmost end of the front wheel.

2. The motorcycle according to claim 1, wherein the rear edge of the first side cover is disposed entirely rearwards of the rear edge of the second side cover.

3. The motorcycle according to claim 1, wherein the side cover further includes a protrusion protruding laterally outwards from the first side cover, the protrusion extending in a motorcycle longitudinal direction, and the second side cover is fixed to the protrusion.

4. The motorcycle according to claim 3, wherein a wind flow path is provided between the first and second side covers to allow a wind to flow therethrough during travelling of the motorcycle, and the wind flow path includes a groove defined by the first side cover, the second side cover, and the protrusion.

5. The motorcycle according to claim 1, wherein the rear edge of the second side cover extends towards a transverse center of the motorcycle.

6. The motorcycle according to claim 1, wherein the vehicle body frame further includes a main frame extending rearwards from the head pipe, and the main frame is disposed above the engine.

7. The motorcycle according to claim 1, wherein the engine is an air-cooled engine.

8. The motorcycle according to claim 1, wherein a wind flow path is provided between the first and second side covers to allow a wind to flow therethrough during travelling of the motorcycle.

9. A motorcycle comprising:
a vehicle body frame including a head pipe;
a steering shaft rotatably inserted into the head pipe;
a front fork attached to the steering shaft;
a front wheel rotatably supported by a bottom portion of the front fork;
a fuel tank disposed rearwards of the head pipe;
a seat disposed rearwards of the fuel tank, the seat allowing a rider to be seated thereon;
an engine disposed under the fuel tank, the engine disposed rearwards of the front wheel;
a front cover disposed forwards of the head pipe; and
a side cover positioned higher than a rear end of the front wheel and a bottom end of the engine, the side cover disposed laterally outwards of the head pipe and the front fork; wherein
a rear end of the side cover is positioned rearwards of a front end of the fuel tank;
the side cover includes:
a first side cover disposed laterally outwards of the head pipe and the front fork: and
a second side cover disposed laterally outwards of the first side cover;
the second side cover includes a lateral end positioned laterally outwards of a lateral end of the first side cover;
a rear edge of the first side cover is at least partially positioned rearwards of a rear edge of the second side cover;
the side cover further includes a protrusion protruding laterally outwards from the first side cover, the protrusion extending in a motorcycle longitudinal direction, and the second side cover is fixed to the protrusion;
the side cover further includes at least one element that is identical to the protrusion, the at least one element and the protrusion being aligned along a vertical direction at a predetermined interval;
a wind flow path is provided between the first and second side covers to allow a wind to flow therethrough during travelling of the motorcycle; and
the wind flow path includes a hole or holes defined by the protrusion and the at least one element.

10. A motorcycle comprising:
a vehicle body frame including a head pipe;
a steering shaft rotatably inserted into the head pipe;
a front fork attached to the steering shaft;
a front wheel rotatably supported by a bottom portion of the front fork;
a fuel tank disposed rearwards of the head pipe;
a seat disposed rearwards of the fuel tank, the seat allowing a rider to be seated thereon;
an engine disposed under the fuel tank, the engine disposed rearwards of the front wheel;
a front cover disposed forwards of the head pipe; and
a side cover positioned higher than a rear end of the front wheel and a bottom end of the engine, the side cover disposed laterally outwards of the head pipe and the front fork; wherein
a rear end of the side cover is positioned rearwards of a front end of the fuel tank;
the side cover includes:
a first side cover disposed laterally outwards of the head pipe and the front fork; and
a second side cover disposed laterally outwards of the first side cover;
the second side cover includes a lateral end positioned laterally outwards of a lateral end of the first side cover;
a rear edge of the first side cover is at least partially positioned rearwards of a rear edge of the second side cover; and
the motorcycle further comprises a flasher lamp disposed under the side cover.

* * * * *